United States Patent [19]
Walter

[11] Patent Number: 6,042,300
[45] Date of Patent: Mar. 28, 2000

[54] CONCRETE AND TIRE ARTIFICIAL REEF

[76] Inventor: David M Walter, P.O. Box 998, Orange Beach, Ala. 36561

[21] Appl. No.: 09/222,160

[22] Filed: Dec. 29, 1998

[51] Int. Cl.$^7$ .................................................... A01K 61/00
[52] U.S. Cl. ............................... 405/29; 405/25; 405/21; 119/222; 119/221
[58] Field of Search ................. 405/15, 21, 22, 405/24, 25, 27, 29, 33, 34, 35; 119/221, 222

[56] References Cited

U.S. PATENT DOCUMENTS

| | | | |
|---|---|---|---|
| 1,140,140 | 5/1915 | Everett et al. ............................ | 405/35 |
| 3,865,049 | 2/1975 | Ono ........................................ | 405/21 |
| 3,884,042 | 5/1975 | Anderson et al. ........................ | 405/27 |
| 5,178,489 | 1/1993 | Suhayda .................................. | 405/21 |
| 5,238,325 | 8/1993 | Krenzler .................................. | 405/21 |
| 5,427,472 | 6/1995 | Ono ........................................ | 405/29 |
| 5,645,371 | 7/1997 | Marzullo ................................. | 405/21 |

*Primary Examiner*—Eileen Dunn Lillis
*Assistant Examiner*—Frederick Lagman

[57] ABSTRACT

An equilateral tetrahedral frame, comprising six concrete beams inserted through the center of a number of automotive tires. The ends of the concrete beams are fastened together at four points. These four points are covered by a cap of concrete to seal the fastening points. The reef device may be of any size. The design permits ease of transport due to its ability to stack one upon another uniqueness of this reef is in the design. Once the reef is transported to its desired location, it can lowered or dropped to the sea floor.

1 Claim, 5 Drawing Sheets

CONCRETE AND TIRE ARTIFICIAL REEF

CROSS REFERENCES TO RELATED APPLICATIONS

BACKGROUND

1. Field of Invention

Machine/Mechanical

This invention relates to fishing, specificity to an apparatus combining recycled automobile tires and a concrete pile tetrahedral frame to form an improved artificial fishing reef.

2. Description of Prior Art

Most commercially manufactured artificial reef devices are made of concrete, steel and/or fiberglass or a combination of the three. The weight of concrete and the cost of fiberglass and steel sets limits on the size of an artificial reef device due to weight and cost. Steel is expensive and will deteriorate in a salt water environment. Many artificial reef devices are made exclusively of concrete and some use some type of tire chips. The chips are mixed with the concrete and only serve as a filler. These are usually made small, due to material cost and weight, with a small surface area. Marine biologists have known for years that automobile tires make better reef material for marine growth than concrete or fiberglass. Concrete is the only known method holding and anchoring them together, that will last throughout the tires life, preventing the tires from finding their way into shrimp nets or onto beaches. That is why, under the present regulations set forth by the National Marine Fisheries and The U.S. Army Corps of Engineers for artificial fishing reef devices using tires, each tire must be imbedded or captured in concrete two times the weight of the tire plus 10%. many tire reef devices have been patented, but their designs have been unable to meet the regulations set forth by the above.

The most common approved method used, was to pour a small concrete slab and imbed the tires, standing up, individually, in the concrete or stack the tires together and pour concrete, around or in the center. This produced a reef device, except for its length, was not much taller than the diameter of the tire used. This method produced a very undesirable reef device, because, due to its size and weight, the reef device would sink into the sand, with little remaining as a surface area for marine growth. Since height and surface area are the two of the most important qualities in an artificial reef device, the use of tires in artificial reefs was not well accepted, due the limitations mentioned in previous reef devices. Artificial reef structures to date have failed for one reason or another to meet the commercial needs of fisherman.

One of many attempts was George W. Rehfeld in U.S. Pat. No. 2,263,313, desribes a steel structure for jetties. The unit is not practical for artificial reefs due to cost, deterioration in salt water and small surface area. It uses no tires and provides no means for preventing sinking into the bottom.

Leo M. Krenzler U.S. Pat. No. 5,807,023, uses tires cut in half and fastened together with steel pins or steel cable. This practice is unlawful in the United States and can not meet the requirements set forth by the U.S. Army Corps of Engineers. Steel fastenings will rust and release the tires, before the tires deteriorate.

Chung-Yi Liaw U.S. Pat. No. 5,526,763 uses tires and bouy units to float the tires as wave breakers. This reef device is designed to float and not rest on the bottom, making it difficult to anchor and survive storms in open water. This type of structure is also unlawful in the Untied States and can not meet the requirements set forth by the US Army Corps of Engineers for artificial tire reef devices.

Benjamin J. Mostkoff U.S. Pat. No. 5,259,695 uses a tetrahedron made of concrete triangles and filled with concrete and tire chips. This reef device is costly and its weight limits its size. The tire chips add nothing except an inexpensive filler, mixed with the concrete. Its small size to weight foot print will cause it to rapidly sink into the sea bottom.

Koichire Aoki, Asano U.S. Pat. No. 4,165,711 describes an elaborate artificial reef device using angled planes to control the flow of water over the reef device, in an attempt to prevent it from sinking into the bottom. This device uses no tires and is costly to produce and must be perfectly positioned on the bottom and remain that way to be effective.

Henry T. Nordberg U.S. Pat. No. 5,214,897 encases tires in concrete squares, leaving a hole through the center. This makes a small heavy reef device, small foot print to weight ratio and very little surface area for marine growth.

Charles M. Waters U.S. Pat. No. 5,080,526 uses a tetrahedral frame with an elaborate triaxial strut assembly in the center. This will make a good artificial barrier as was his intent, but a poor artificial reef device. It does not provide a very large surface area for marine growth and its foot print to weight ratio is poor, causing it to sink into the sand. The manufacture is costly and so is the transport and deployment, due to its unstackability.

A. J. Bruner, Edward T. Foster and Thomas N. Kearns U.S. Pat. No. 4,186,913 uses the simple method of pouring concrete around the tires (imbedding). The drawbacks to this method are the reef device can stand no taller than the diameter of the tire, a large suface area of the tire is wasted for marine growth, due to it being imbedded in concrete. Some settling is expected for any reef device and this device will all but disappear into the bottom, due to its short height.

Danny B. Halliburton U.S. Pat. No. 5,236,756 fastens tires together using pins and plates. This pratice for an artificial reef device is unlawful in the United States. and if it were legal, would make a poor reef device, due to height and small amount of weight. It would tend to roll away during storms or rapid current.

Donald L. Kiselewsiki U.S. Pat. No. 4,997,309 stacks automotive tires together and pours concrete in the center. This device will meet the current regulations for a concrete and tire reef devices. The device uses concrete and tires in an ineffecient manner. The end product has little surface area for marine growth for its weight. The device can not be depended upon to stand on its end on the sea bottom and lying on its side is no taller than the diameter of the tire used. The excessive small foot print to weight ratio will cause the device to sink into the sand, rendering the device ineffective as an artificial reef device.

OBJECTS AND ADVANTAGES

Accordingly, several objects and advantages of my invention are the height and surface area of my reef are far geater per dollar of cost, than any other commercial artificial reef available. Using the current regulations set forth by the Nation Marine Fisheries and U.S. Army Corps of Engineers for concrete and tire reefs, imbedded or captured in concrete, two times the weight of the each tire, plus 10%. My device can achieve greater heights and a larger area while keeping the weight to a managable level. The design also permits stacking the reefs to save space in transport. Once on the sea floor the large foot print of the tires at the bottom of the device will surport the reef while accumulating sand. This will cause the reef to sink a few inches into the bottom. This will anchor the reef during storms. The 10 foot plus height will attract Amberjack fish, whereas shorter reefs do not. Another advantage is the sturdy and durable construction will last for years and allow for the reef to be moved if necessary. The geatest advantage to our nation is using the least amount of energy to recycle automotive tires and converting them to fish. This has a double advantage of sparing the nations landfills, increasing the economy and helping to save our dwindling stocks of fish, specificity Red Snapper.

Still further objects and advantages will become apparent from a consideration of the ensuing description and accompanying drawings. My reef is 10' tall, although it the design does not limit the size and height, Persons purchasing and fishing artificial reefs in the Gulf of Mexico, know reefs over 8' tall produce Amberjack fish, as well as Red Snapper, Triggerfish, Grouper and others. This is true for other species as well. This makes a highly desirable reef. I can produce my reef at a much less cost than my nearest competitor and when one compares height and surface area, there is no competition. The design allows for stacking the reefs as much as four high. This is desirable to save deck space on the deployment vehicle.

Figure 1:
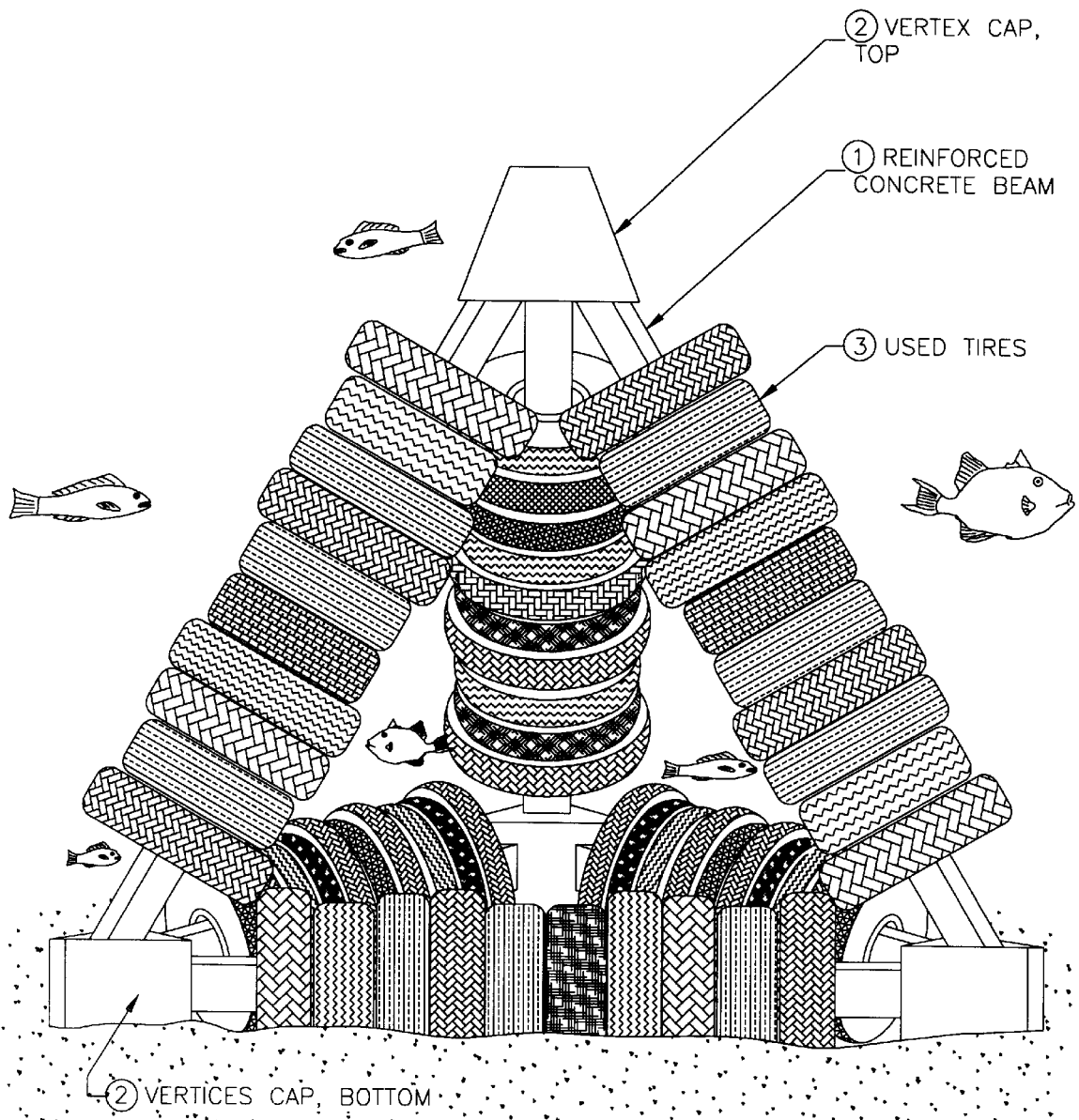
FIG. 1 is a perspective side view of my invention as it will look when deployed on the sea floor.

REFERENCE NUMERALS 1 concrete beams
2 joints
3 automotive tires

SUMMARY

A device comprising six beams jointed together at four points, each beam protrudes through the center of a number of automotive tires, forming an equilateral tetrahedral frame, the joining together traps the tires on a continuous concrete beam.

PREFERRED EMBODIMENT—DESCRIPTION

FIG. 1 is a side view of the equilateral tetrahedral frame reef showing the six concrete beams 1 joined together at four joints 2. Each beam 1 is inserted through the center of a number of automotive tires 3. The tires 3 are loose on the beams 1 and free to rotate and move up and down movement along the beam 1, but up and down movement is limited by the joints 2.

Figure 2:
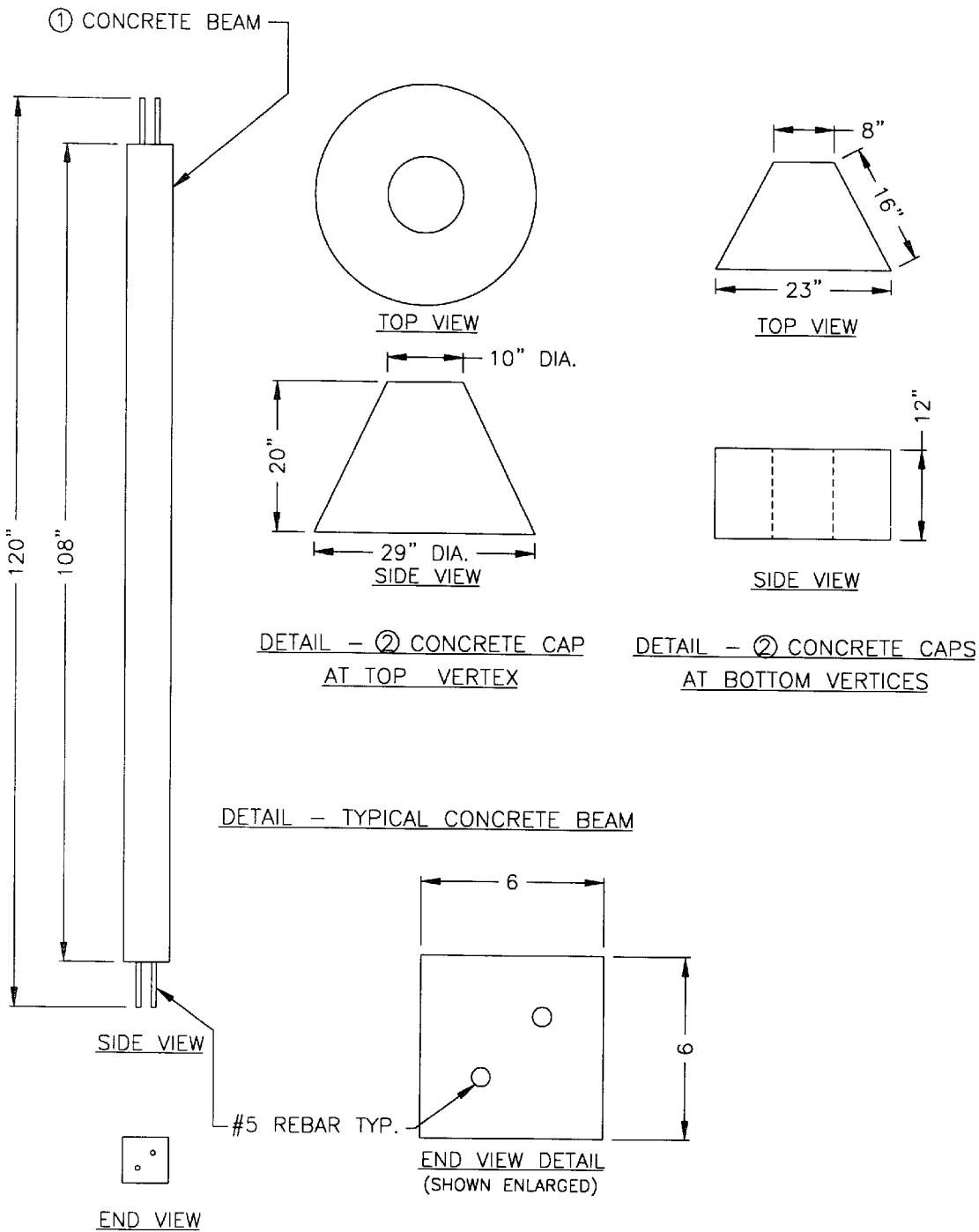
FIG. 2 is a side and end view of one of the six concrete piles containing two ½ inch diameter rebars and a side and end view of one of the four concrete joints poured over the a joining beams after the rebar ends are fastened together.

FIG. 2 is a side and end view of one of the six concrete beams 1, with protruding rebar from the ends. Also shown are top and side views of the concrete joints 2 used to cover the rebar joints at the four joints 2.

Figure 3:
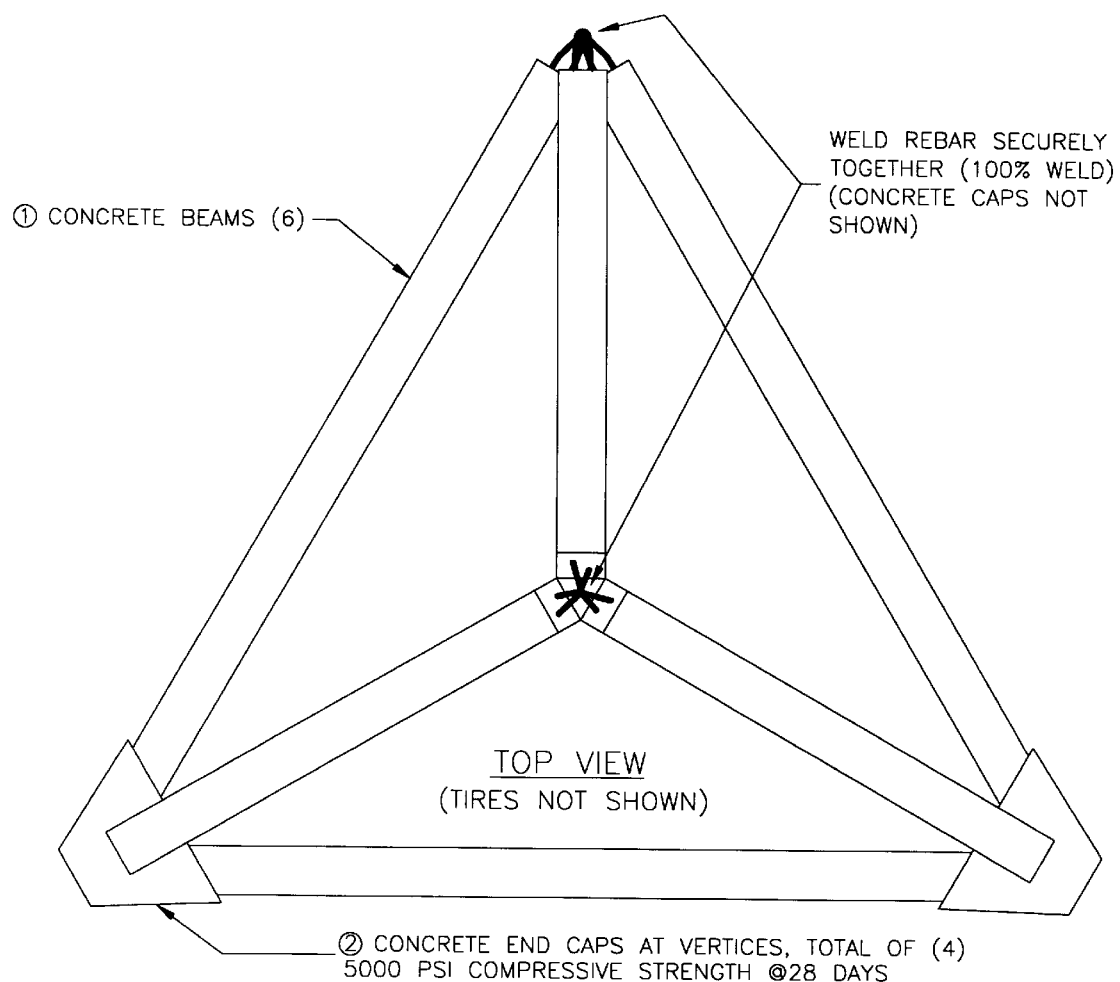
FIG. 3 is a top view of the concrete piles after assembly and two of the four poured concrete joints are completed and the remaining two joints shows the rebar ends 100% welded together, pior to pouring the end caps. This view does not contain the sixty automotive tires that would normally have been installed at this phase of assembly.

FIG. 3 is a top view of the reef showing how the concrete beams 1 with rebar protruding from the ends are joined and welded pior to the poured concrete joint 2.

Figure 4:
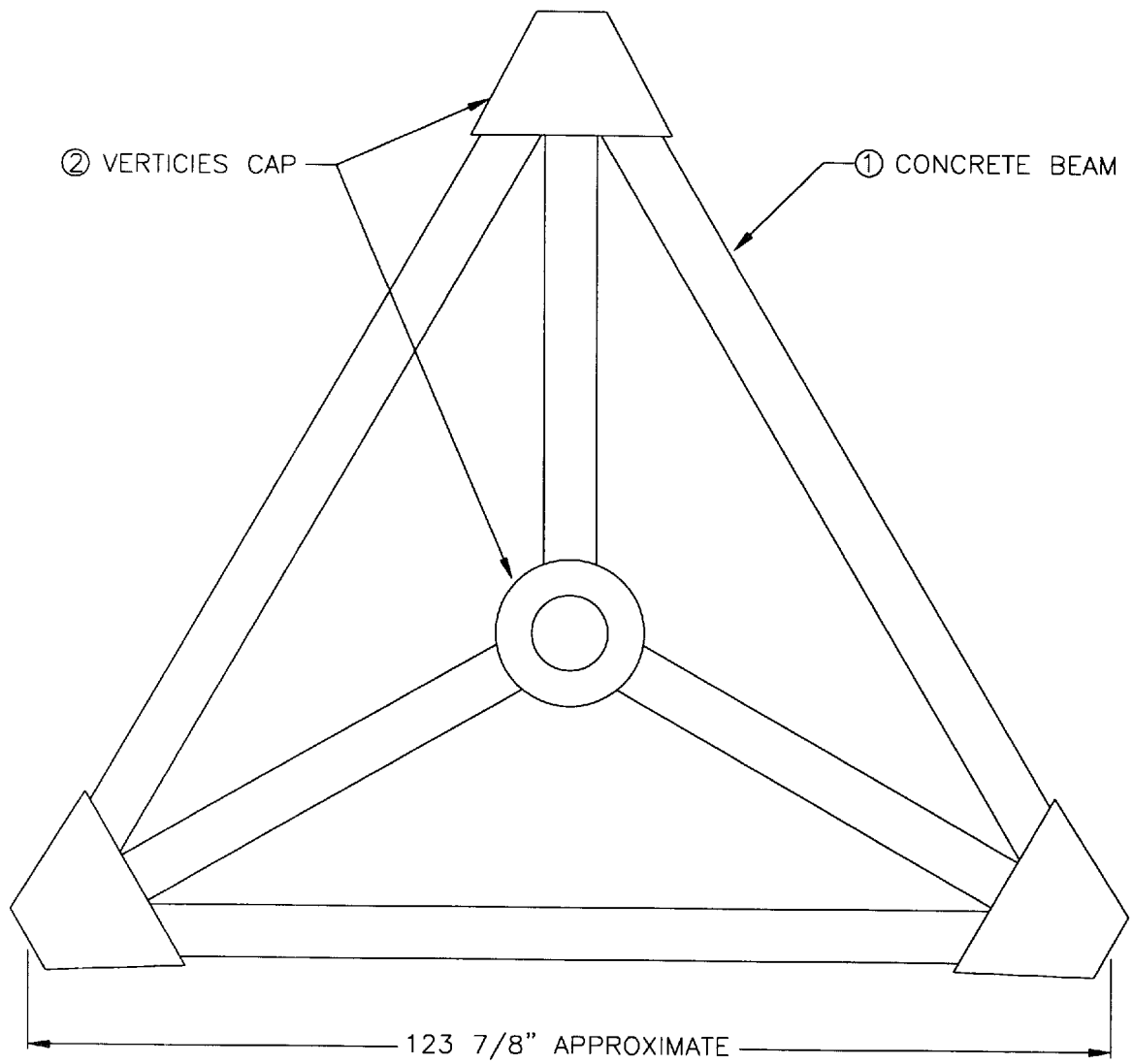
FIG. 4 is a view of the completed concrete piles and poured joints, but without the normally installed sixty plus automotive tires at this phase.

FIG. 4 is a top view of a completed reef (without the normally installed tires 3) showing the six beams 2 with the four concrete caps 2.

Figure 5:
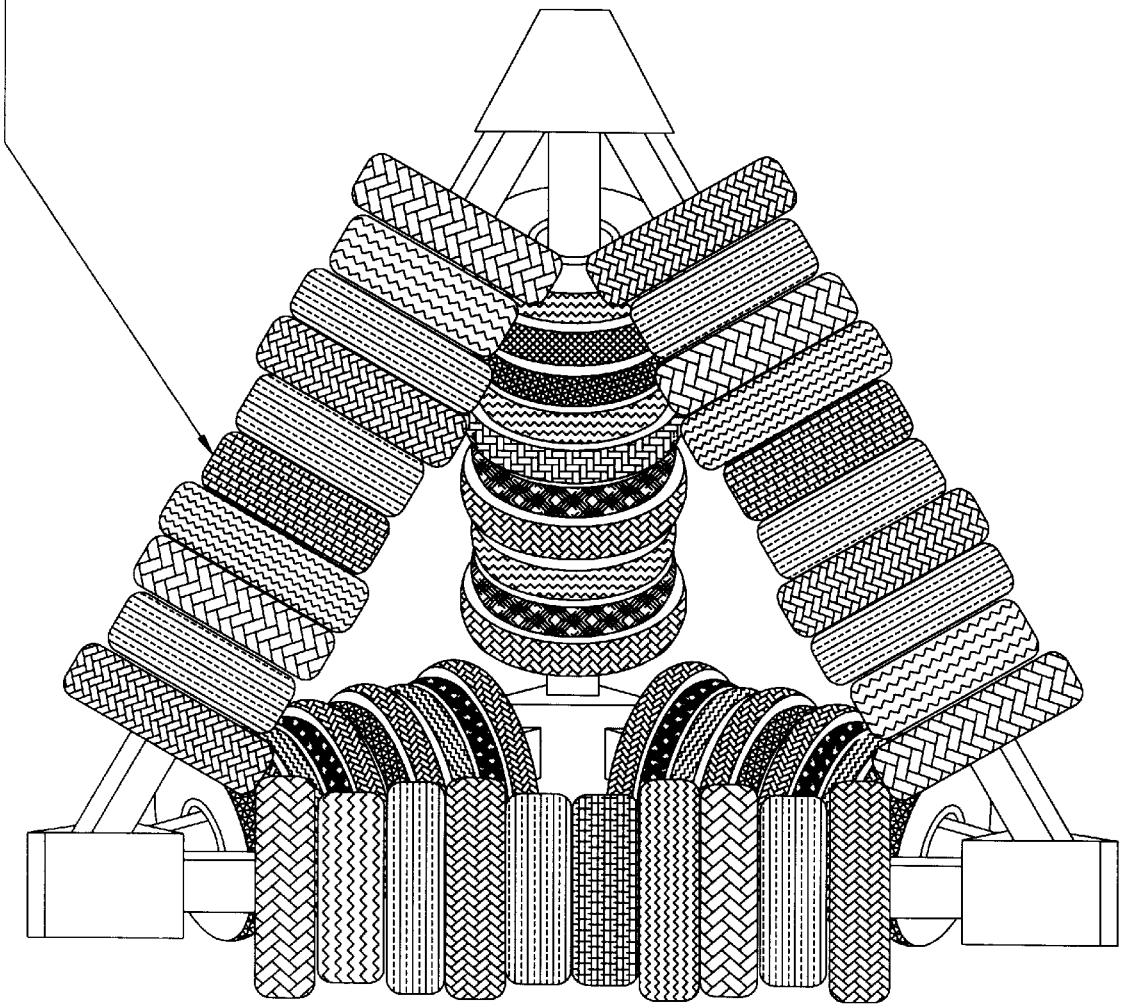
FIG. 5 is a side view of the completed artificial reef.

FIG. 5 shows a side view of the completed reef.

PREFERRED EMBODIMENT—OPERATION

This reef has no moving parts. The design is functional for the following reasons.

1. The concrete frame is a continuous concrete beam equilateral tetrahedral frame, sealed at the joints with concrete. This forms a strong structure imperious to corrosion from a harsh salt water environment.
2. The tires are trapped onto the concrete beams and can not come loose.
3. The tires provide an excellent habitat and surface area for marine growth. The tires are an inexpensive reef material.
4. The frame work of concrete beams allows the tires to stand well above the sea bottom. This is a great advantage for an artificial reef, because greater height will attract larger and greater variety of fish.
5. The tires on the bottom of the reef provide a large foot print to prevent the reef from sinking into the sea bottom. The tires on the bottom will sink some and accumulate some sand. This will anchor the reef during periods of storms.

CONCLUSIONS, RAMIFICATIONS, AND SCOPE

Accordingly, it can be seen that this artificial reef is novel in its approach to the problem of the use of tires in an artificial reef. This design is not limited in size and by using more or larger tires could be expanded indefinitely. This reef is currently being sold to my customers, while include charter boat fisherman and individual private boat owns. The reef is preforming exceptionally well.

Although the description above contains many specificities, these should not be construed as limiting the scope of the invention but as merely providing illustrations of some of the presently preferred embodiments of this invention. Various other embodiments and ramifications are possible within it's scope. For example, these structures could be used for all types of erosion problems, break water jettes. Everytime this device is used 60 plus automobile tires are being recycled.

Thus the scope of the invention should be determined by the appended claims and their legal equivalents, rather than by the examples given.

What is claimed is:

1. An artificial reef for attracting fish and for creating a marine habitat to promote the growth of fish for harvesting, the artificial reef comprising: six concrete beams and a plurality of automotive tires, wherein each beam protrudes through the center of a number of the automotive tires and wherein the beams are jointed together at their ends at four points so as to form an equilateral tetrahedral frame.

* * * * *